3,036,054
PREPARATION OF POLYVINYL ALCOHOL

Ora L. Wheeler, Mountain Lakes, and Harold Diemer Smyser, Plainfield, N.J., assignors to Air Reduction Company, Incorporated, New York, N.Y., a corporation of New York
No Drawing. Filed Feb. 3, 1958, Ser. No. 712,670
5 Claims. (Cl. 260—89.1)

This invention relates to the production of polyvinyl alcohol and, more particularly, to a process for producing polyvinyl alcohol of high viscosity by hydrolysis of polyvinyl acetate prepared by polymerizing a vinyl acetate monomer in the presence of a peroxydicarbonate ester catalyst. The invention also includes a process for producing polyvinyl alcohol of a relatively low viscosity on the order of 25 to 75 centipoises by hydrolyzing a polyvinyl acetate prepared by polymerizing vinyl acetate in the presence of an alkyl peroxydicarbonate and a small amount of acetaldehyde.

It is the principal object of this invention to provide a practical and economical process for producing polyvinyl alcohol of high viscosity, between about 100 to 300 centipoises, as well as low viscosity polyvinyl alcohol on the order of 25 to 75 centipoises.

This invention broadly involves the polymerization of a vinyl acetate monomer in the presence of a suitable peroxydicarbonate ester catalyst such as isopropyl peroxydicarbonate. The polymerization is carried out at the reflux temperature of the vinyl acetate reaction mixture and the amount of peroxydicarbonate ester catalyst is controlled to effect an automatic termination of the polymerization reaction at the desired conversion of the vinyl acetate to polyvinyl acetate. Any remaining vinyl acetate is then flashed off and the polyvinyl acetate product recovered. The resulting polyvinyl acetate is then hydrolyzed by conventional methods to form the high viscosity polyvinyl alcohol.

The peroxydicarbonate ester catalysts employed in the process of this invention are known catalysts for the polymerization of unsaturated compounds at low temperatures and at relatively high concentrations as disclosed in the United States patent to Strain, No. 2,370,588. This invention broadly resides in the surprising discovery that vinyl acetate can be polymerized at relatively high temperatures employing the peroxydicarbonate ester catalysts and that the catalysts can be used in surprisingly low concentrations. In addition, it has been found that the use of the peroxydicarbonate catalysts at high temperatures and low concentrations as disclosed herein produces many advantageous and unobvious results. For example, it is thus possible to provide a simple process for producing high viscosity polyvinyl alcohol from a relatively low viscosity polyvinyl acetate without the use of any additives or polymerization inhibitors. The process also permits accurate control of the conversion of the vinyl acetate to polyvinyl acetate by controlling the amount of catalyst used so that the catalyst is completely used up or destroyed when the desired percent conversion has been obtained. The amount of catalyst used is extremely small and the reaction can proceed at normal reflux temperatures. In addition, the unconverted polyvinyl acetate can be easily recovered and subsequently used in the production of additional polyvinyl acetate and is in no way contaminated with inhibitors or other various additives. The recovered vinyl acetate is also free of catalyst since the catalyst is destroyed and used up during the polymerization reaction. The unconverted vinyl acetate can thus also be flashed off at high temperatures without effecting any further undesired polymerization.

Either commercial or pure (distilled) vinyl acetate can be used according to this invention. The vinyl acetate can also contain inhibitors such as hydroquinone which do not interfere with the polymerization reaction provided sufficient catalyst is used as disclosed in more detail below.

Various peroxydicarbonate esters can be used as catalysts according to this invention so long as the particular peroxydicarbonate ester employed is capable of being decomposed or used up during the polymerization of the vinyl acetate at reflux temperatures so that the amounts thereof can be controlled to limit the extent of the vinyl acetate polymerization to the desired degree. Some suitable peroxydicarbonate esters which can be used according to this invention are described in United States Patent No. 2,370,588 issued February 27, 1945. The alkyl peroxydicarbonates derived from alcohols containing up to about 18 carbon atoms such as methyl, ethyl, isopropyl, n-propyl, isobutyl, n-butyl, and so forth described in the above United States patent are particularly useful. Isopropyl peroxydicarbonate has been found to be particularly advantageous.

The amount of peroxydicarbonate catalyst used to effect the desired polymerization of the polyvinyl acetate will depend to some extent upon the particular peroxydicarbonate catalyst being employed, the extent of polymerization desired, as well as the particular polyvinyl acetate monomer being polymerized. The amount of catalyst necessary can readily be determined by those skilled in the art by routine experimentation. When relatively pure (distilled) vinyl acetate monomer is being polymerized less catalyst can generally be used. The presence of impurities may inactivate some of the catalysts thus necessitating a larger amount to effect the desired polymerization. For example, hydroquinone is a common inhibitor present as an impurity in commercial vinyl acetate monomers which will inactivate part of the catalyst necessitating the use of larger amounts than would be required with a relatively pure monomer to obtain the same percent conversion. If it is desired to polymerize the vinyl acetate monomer to about 75 percent conversion, the use of more catalyst would of course be required than if a more incomplete polymerization or conversion was desired. The amount of catalyst employed should be sufficient to effect the desired extent of polymerization so that all of the catalysts will be used up during the polymerization and the reaction automatically stopped when the desired extent of polymerization has been obtained.

When employing isopropyl peroxydicarbonate and polymerizing the vinyl acetate monomer at reflux temperature, 0.00418 percent isopropyl peroxydicarbonate based on the weight of the polyvinyl acetate monomer being polymerized has been found to be generally sufficient to effect a conversion of the vinyl acetate monomer to the vinyl acetate polymer of between about 60 to 75 percent. The use of less catalyst reduces the percent conversion while the use of more catalyst generally increases the percent conversion. Where the vinyl acetate monomer contains the usual amounts of hydroquinone inhibitor, it has been found to be necessary to use approximately 0.0055 percent isopropyl peroxydicarbonate in order to achieve a percent conversion between 60 and 75 percent. The preferred catalyst range when using isopropyl peroxydicarbonate is between about 0.0035 and 0.0055.

The extent of polymerization of the vinyl acetate monomer will depend mainly upon the viscosity desired in the resulting polyvinyl alcohol obtained by the hydrolysis of the polyvinyl acetate. The polymerization of the vinyl acetate to between about 50 to 75 percent completion results in the production of a polyvinyl alcohol having a viscosity between about 100 to 300 centipoises. The polymerization of the vinyl acetate to much above 75 percent completion results in the formation of a polyvinyl acetate of extremely high viscosity which is difficult to handle and subsequently hydrolyze to polyvinyl alcohol. The polymerization of the vinyl acetate to less than about 50 percent completion begins to become uneconomical outweighing any advantages which might be gained by stopping the polymerization at a point less than about 60 percent completion.

The vinyl acetate is polymerized according to this invention by known suspension or bead polymerization techniques. The vinyl acetate together with the aqueous reaction mixture and various protective colloids are placed into a suitable reaction vessel with a reflux column and the reaction mixture heated to reflux. The reflux temperature may vary from an initial temperature of about 65° C. to a final temperature of around 70 to 75° C. where the amount of catalyst is controlled to effect between about a 50 to 75 percent conversion of the vinyl acetate. It has also been found that it is advantageous to add the peroxydicarbonate catalyst to the reaction mixture after it has been brought up to reflux temperature. The reaction is continued at least until the reaction temperature becomes stable and preferably for about one-half hour thereafter.

When acetaldehyde is also used in the polymerization of vinyl acetate for subsequent conversion to low viscosity polyvinyl alcohol according to this invention, the same polymerization conditions, catalysts, and proportions are likewise applicable and the same advantageous results are obtained.

The acetaldehyde can be added to the reaction mixture prior to or together with the catalyst. The amount of acetaldehyde added can be varied to produce polyvinyl acetate of different low viscosities and correspondingly different low viscosity polyvinyl alcohols as will be understood by those skilled in the art. In the production of a polyvinyl acetate having a viscosity of about 40 to 200 centipoises, an amount of acetaldehyde between about 8 to 30 cc. per 20 pounds of vinyl acetate monomer has been found to be preferable. The hydrolysis of such polyvinyl acetate having a viscosity between about 40 to 200 centipoises results in the production of polyvinyl alcohol having a viscosity between about 25–75 centipoises. The amount of acetaldehyde and also the percent of vinyl acetate polymerization can be varied to produce low viscosity polyvinyl acetates which upon hydrolysis will result in the production of polyvinyl alcohols both above 75 and below 25 centipoises.

The hydrolysis of the polyvinyl acetate to polyvinyl alcohol can be carried out by known conventional methods. It is preferred to hydrolyze the polyvinyl acetate either by alcoholysis, i.e., ester interchange or by treatment with water containing an acidic catalyst. The term "hydrolysis" as used herein is used in a generic sense to signify the replacement of acetyl groups of the polyvinyl acetate with hydroxyl groups and is intended to include such processes as alcoholysis.

Alcoholysis can be carried out with any desired alkanol but it is preferable to use an alkanol of 1 to 4 carbon atoms such as methanol and ethanol. The catalyst can be an alkali-metal alkoxide and can be suitably used in amounts between 0.5 and 5 percent based on the weight of the polyvinyl acetate. The alcoholysis reaction can proceed at various temperatures. A temperature above about 20° C. is desirable, the preferred temperature range being between about 50 and 120° C. The polyvinyl alcohol separates from its alkanol solution as the hydrolysis proceeds and can readily be recovered and washed with suitable non-solvents to remove the catalyst which may be present.

Hydrolysis in an aqueous medium is preferably carried out with a strong acid catalyst such as sulfuric acid or phosphoric acid at a temperature preferably between 75 and 100° C.

Table I sets forth a number of specific illustrative examples showing the amount of isopropyl peroxydicarbonate used, the final reflux temperature, the percent conversion of the vinyl acetate monomer to the polymer together with the viscosity of the polyvinyl acetate and the resulting polyvinyl alcohol.

*Table I*

| Example No. | Percent Isopropyl Peroxydicarbonate | Final Temp., ° C. | Percent Conversion | Polyvinyl Acetate Viscosity (cps.) | Polyvinyl Alcohol Viscosity (cps.) |
|---|---|---|---|---|---|
| 1 | 0.00452 | 71 | 70 | 1175 | 195 |
| 2 | 0.00418 | 70 | 65 | 1010 | 250 |
| 3 | 0.00418 | 70 | 65 | 1015 | 262 |
| 4 | 0.00418 | 69 | 60 | 766 | 225 |
| 5 | 0.00418 | 73 | 77 | 1460 | 142 |
| 6 | 0.00418 | 70 | 65 | 505 | 162 |
| 7 | 0.00418 | 71 | 70 | 592 | 166 |
| 8 | 0.00418 | 70 | 65 | 859 | 156 |
| 9 | 0.00418 | 71 | 70 | 868 | 140 |
| 10 | 0.0055 | 69.5 | 63 | 940 | 214 |
| 11 | 0.0055 | 70.5 | 68 | 839 | 175 |
| 12 | 0.0055 | 70 | 65 | 914 | 191 |
| 13 | 0.0055 | 72 | 74 | 893 | 193 |

Table II sets forth a number of specific illustrative examples showing the use of acetaldehyde in the production of low viscosity polyvinyl acetate and in the production of low viscosity polyvinyl alcohol showing the amount of catalyst and acetaldehyde employed, the percent conversion, and the viscosities of the resulting polyvinyl acetate and polyvinyl alcohol.

*Table II*

| Example No. | Percent Isopropyl Peroxydicarbonate | Amount of Acetaldehyde (cc.) | Percent Conversion | Polyvinyl Acetate Viscosity (cps.) | Polyvinyl Alcohol Viscosity (cps.) |
|---|---|---|---|---|---|
| 14 | 0.0055 | 20.1 | 65 | 182 | 72 |
| 15 | 0.0055 | 29.9 | 65 | 45 | 28 |

In all of the above Examples 1 through 15, 20 pounds of vinyl acetate together with 20 pounds of distilled water and between about 2.5 to 14 grams of polyvinyl alcohol, trade name Colton PA–40 were first charged into a suitable reaction vessel equipped with a stirrer, thermometer well, and reflux condenser. The reaction mixture was then heated and brought up to reflux. At this point the catalyst was added and the reaction mixture allowed to reflux until the temperature remained constant for one-half hour. The peroxy-dicarbonate catalyst was added in the form of a 1 percent solution in vinyl acetate. The percent isopropyl peroxydicarbonate is based on the weight of the vinyl acetate. After the temperature remained constant for one-half hour the remaining vinyl acetate was flashed off as rapidly as possible and the resulting polyvinyl acetate beads centrifuged, washed, and dried. In Examples 14 and 15 the acetaldehyde was added together with the vinyl acetate prior to the catalyst addition and the final reflux temperature was about 70° C.

The vinyl acetate used in Examples 1 through 5 inclusive was distilled, relatively pure vinyl acetate monomer. After the fifth example, the recovered monomer was reused in each successive example through and including Example 9 with no treatment or purification of the recovered monomer except separation from water. In Example 10, as well as in Examples 14 and 15, vinyl acetate monomer inhibited with the conventional small amount of hydroquinone was used thus necessitating an increase in the amount of catalyst as shown. After the tenth example, the recovered monomer was reused in each successive example through and including Example 13 with no treatment or purification of the recovered vinyl acetate except separation from water.

The polyvinyl acetate produced in Examples 1 through 15 was hydrolyzed by dissolving the polyvinyl acetate beads in methanol to form about a 20 percent by weight solution. Methanol together with a sodium methylate catalyst was placed in a resin kettle and the polyvinyl acetate-methanol solution slowly added to the methanol-catalyst mixture. The amount of sodium methylate catalyst used was about 10 percent by weight based on the weight of the polyvinyl acetate and the reaction was carried out at a temperature of about 50° C. Under the above conditions the hydrolysis was almost instantaneous and about 98 percent of the acetyl groups replaced with hydroxyl groups.

The viscosities of the polyvinyl alcohols referred to herein were measured in a 4 percent aqueous solution at 20° C. The viscosities of the polyvinyl acetate were measured in a molar benzene solution of the polyvinyl acetate at 20° C.

We claim:

1. The process of preparing polyvinyl alcohol which comprises suspension polymerizing vinyl acetate in an aqueous medium containing a protective colloid as a suspension agent at about the reflux temperature of the vinyl acetate reaction mixture in admixture with from about 0.0035 to about 0.0055 percent by weight based on the weight of vinyl acetate, of isopropyl peroxydicarbonate to effect a conversion of vinyl acetate to polyvinyl acetate not above about 50 to 75 percent and hydrolyzing the resulting polyvinyl acetate until at least about 75 percent of the acetyl groups of the polyvinyl acetate has been converted to hydroxyl groups to produce polyvinyl alcohol having a viscosity measured in a 4 percent aqueous solution at 20° C. of from 100 to 300 centipoises.

2. The process of claim 1 in which the resulting polyvinyl acetate is hydrolyzed until at least about 95 percent of the acetyl groups has been converted to hydroxyl groups.

3. The process of claim 1 wherein the protective colloid is polyvinyl alcohol.

4. The process of preparing polyvinyl alcohol which comprises suspension polymerizing vinyl acetate in an aqueous medium containing a protective colloid as a suspension agent and from about 8 cc. to about 30 cc. per 20 pounds of vinyl acetate of acetaldehyde at about the reflux temperature of the reaction mixture in admixture with from about 0.0035 to about 0.0055 percent by weight based on the weight of vinyl acetate, of isopropyl peroxydicarbonate to effect a conversion of vinyl acetate to polyvinyl acetate not above about 50 to 75 percent to form polyvinyl acetate having a viscosity measured in a 4 percent aqueous solution at 20° C. of from about 40 to 200 centipoises and hydrolyzing the resulting polyvinyl acetate until at least about 75 percent of the acetyl groups of the polyvinyl acetate has been converted to hydroxyl groups to produce polyvinyl alcohol having a viscosity measured in a 4 percent aqueous solution at 20° C. of from about 25 to about 75 centipoises.

5. The process for preparing partially polymerized vinyl acetate which comprises suspension polymerizing vinyl acetate in an aqueous medium containing a protective colloid as a suspension agent at about the reflux temperature of the vinyl acetate in admixture with from about 0.0035 to about 0.0055 percent by weight based on the weight of vinyl acetate, of isopropyl peroxydicarbonate to effect a conversion of vinyl acetate to polyvinyl acetate not above about 50 to 75 percent.

References Cited in the file of this patent

UNITED STATES PATENTS 2,108,857    Hopff et al. _____ Feb. 22, 1938
2,843,576    Dunn et al. _____ July 15, 1958